United States Patent
Koyun et al.

(10) Patent No.: US 10,988,699 B2
(45) Date of Patent: Apr. 27, 2021

(54) PLASMA GASIFICATION REACTOR AND METHOD

(71) Applicants: Ahmet Koyun, Istanbul (TR); Ibrahim Yayalik, Atasehir/Istanbul (TR)

(72) Inventors: Ahmet Koyun, Istanbul (TR); Ibrahim Yayalik, Atasehir/Istanbul (TR)

( * ) Notice: Subject to any disclaimer, the term of this patent is extended or adjusted under 35 U.S.C. 154(b) by 159 days.

(21) Appl. No.: 15/775,773

(22) PCT Filed: Nov. 11, 2016

(86) PCT No.: PCT/TR2016/050434
§ 371 (c)(1),
(2) Date: May 11, 2018

(87) PCT Pub. No.: WO2017/082847
PCT Pub. Date: May 18, 2017

(65) Prior Publication Data
US 2018/0334624 A1  Nov. 22, 2018

(30) Foreign Application Priority Data

Nov. 13, 2015 (TR) .................................. 2015/14284

(51) Int. Cl.
*C10J 3/08* (2006.01)
*C10J 3/72* (2006.01)
(Continued)

(52) U.S. Cl.
CPC .................. *C10J 3/08* (2013.01); *C01B 3/02* (2013.01); *C10J 3/57* (2013.01); *C10J 3/723* (2013.01);
(Continued)

(58) Field of Classification Search
CPC ....... C10J 3/08; C10J 3/57; C10J 3/723; C10J 2300/0959; C01B 3/02
See application file for complete search history.

(56) References Cited

U.S. PATENT DOCUMENTS

| | | | | |
|---|---|---|---|---|
| 5,227,603 A | * | 7/1993 | Doolette | H05H 1/42 219/121.48 |
| 5,744,117 A | * | 4/1998 | Wilkinson | A62D 3/32 423/563 |

(Continued)

FOREIGN PATENT DOCUMENTS

| | | |
|---|---|---|
| EP | 1 896 774 B1 | 3/2008 |
| WO | 96/10097 A1 | 4/1996 |
| WO | 96/27412 A1 | 9/1996 |

OTHER PUBLICATIONS

International Search Report and Written Opinion of the International Searching Authority for corresonding International Patent Application No. PCT/TR2016/050434 dated Mar. 27, 2017, 10 pages.

*Primary Examiner* — Paul A Wartalowicz
(74) *Attorney, Agent, or Firm* — Merchant & Gould P.C.

(57) ABSTRACT

The invention is related to a reactor (1) comprising at least one temperature unit (20) which provides high temperature, at least one waste inlet (11) from which the fuel and/or wastes are fed to the reactor (1), at least one reactant inlet (13 and/or 14 and/or 17), at least one melt outlet (15) which provides exiting of the melts formed by inorganic substances coming from the fuel and/or wastes via heat, at least one high temperature region (12) where endothermic reactions occur and a gas outlet (16) which provides that the fuel and/or wastes entering to the reactor (1) are directed to the high temperature region (12) such that the gasification does not start before they enter to this region (12) and therefore, where the gases leaving the reactor (1) as a result of the reaction exit from the reactor (1) by passing through the high temperature region (12) and which has a different openness from the waste inlet (11); having a high temperature region (12) positioned between the waste inlet (11) and gas outlet (16), and body (10) which has a form providing that the
(Continued)

wastes pass through the high temperature region (12) such that the gasification does not start before the fuel and/or wastes entering to the reactor (1) enter to the high temperature region (12) and therefore, that the gases having at least 1200° C. temperature exit from the reactor (1) and to the working method (100) of this reactor (1).

12 Claims, 2 Drawing Sheets

(51) Int. Cl.
    *C10J 3/57*     (2006.01)
    *C01B 3/02*     (2006.01)

(52) U.S. Cl.
    CPC ............. *C10J 2300/0959* (2013.01); *C10J 2300/0976* (2013.01); *C10J 2300/1238* (2013.01)

(56) References Cited

U.S. PATENT DOCUMENTS

| | | | | |
|---|---|---|---|---|
| 6,678,470 B1* | 1/2004 | Hoshino | ............. | H05B 3/0009 392/311 |
| 2006/0280663 A1* | 12/2006 | Osato | ............. | B01J 19/20 422/226 |
| 2008/0202993 A1* | 8/2008 | Eley | ............. | C12M 21/16 210/130 |
| 2010/0146856 A1* | 6/2010 | Zamansky | ............. | C10J 3/466 48/77 |

\* cited by examiner

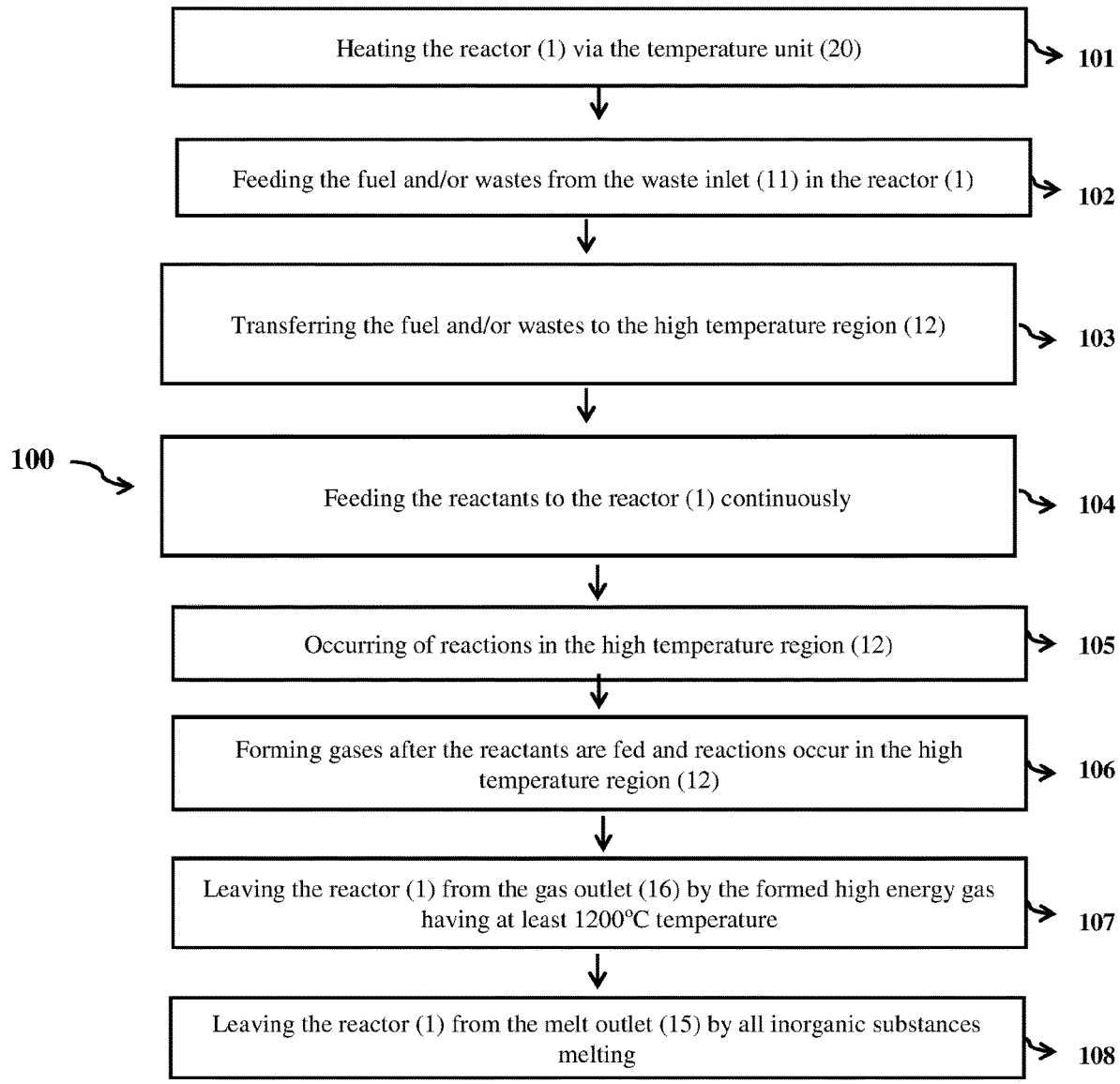

PLASMA GASIFICATION REACTOR AND METHOD

This application is a National Stage Application of PCT/TR2016/050434, filed 11 Nov. 2016, which claims benefit of Serial No. 2015/14284, filed 13 Nov. 2015 in Turkey, and which applications are incorporated herein by reference. To the extent appropriate, a claim of priority is made to each of the above disclosed applications.

RELATED TECHNICAL FIELD OF THE INVENTION

This invention is related to a reactor used for the plasma gasification process and to a gasification method for this reactor.

PRIOR ART

Wastes which increase rapidly depending on high rate urbanization and variety of consumer goods create environmental pollution. Reactors which have been developed and/or are being developed remove harmful effects of the wastes on the environment and also provide resource for increasing energy need substantially.

In the common plasma gasification, materials (fuel, trash, solid waste etc.) are fed to the reactor from above. The gas products formed also leave the reactor from above. Additionally in the conventional plasma reactors; because the temperature is not high enough (e.g. because it is below 1000° C.) in the top sides of the reactor, carbon which remains during gasification or tar which cannot decompose accumulate in the inlet and outlet arms of the reactor by dragging with the gas flow. Therefore; it causes blockage in various sections of the reactor. That's why, reforming units are added to these reactors. This causes extra costs.

In the conventional reactors, the most efficient gasification occurs at the temperature range of 800-1000° C. In fact, these temperature values are not enough for melting and dissolving ash and tar. Because the ash starts to melt above 1200° C. and tar dissolves above 1200° C. That's why; ash melting unit is added to the reactor body or the ash problem in the reactor is required to be solved in another way. In addition; energy value of the exit gas decreases because of the soot (solid carbon) and tar which cannot gasify in the gasification performed at these temperatures (800-1000° C.). Because the solid carbon and tar cannot gasify, gas recovery units are added to the reactor body or the section where the gas exits from the reactor. These units provide the gas exiting from the reactor to be extra processed on the purposes of its purification/increasing its energy/providing high efficiency. All of these affects the system efficiencies negatively because of the additional energy consumptions. These reasons prevent that the other gasification and plasma gasification reactors become an economical alternative solution for removal of the wastes in excess amounts which is formed especially nowadays as a natural result of increase of urbanization and consumption.

Also, the wastes gasify partially until they reach to the place where the plasma is found in this type reactors. The partial gasification may form a very significant part of the total gasification and because it occurs at low temperatures, the reactants (other inlet materials) fed to the reactor with the gases formed cannot react enough. For this reason, the heating value of the gas product passes the economic point. Besides, liquid compounds like tar create problem by remaining without dissolving. Because the gas products obtained in these reactors are the gases with less lower heating values, substances which have energy value cannot be obtained and efficiency loss is experienced.

In the patent document with the number of TR 2009/01524, a waste treatment method comprising a plasma processing step which encloses the waste gas and coal to be subjected to the plasma process is mentioned. Any gas composition, gas efficiency above 1200° C. is not indicated in all sources about plasma gasification, scientific and technical literature and any document is not based on a realized concrete result and is not supported with clear expressions.

BRIEF DESCRIPTION OF THE INVENTION

The aim of this invention is to carry out a plasma reactor providing high energy gas outlet and a gasification method for this reactor.

In the invention, it is provided that the plasma exit gas is directed to a different exit from the section of the reactor where fuel or waste enters and the fuel does not heat and gasify at the inlet before it comes to the high temperature region (plasma section).

In an embodiment of the invention, the reactor comprises gas outlet positioned at a higher level than the waste inlet. Therefore; directing of the high temperature gases from the waste inlet to the opposite direction of the direction from which the fuel and/or waste comes is provided by creating pressure difference.

Primary and secondary reactant inlet equipment which may be directed from different points that can change to the high temperature region inlet, high temperature region and high temperature region outlet are added.

The elemental level and ionic level reactions which occur so fast due to the nature of the plasma process are directed to the gas product direction which has high heating value.

The invention is developed such that gas products with high heating values are obtained by directing the reactions differently at relatively high temperatures. This situation is given in the graphs.

In the invention; the fuel and/or wastes enter to high temperature regions formed at high temperatures (above 1200° C.) that are not seen in literature. Oxygen or oxygen—steam mixture is fed to first inlet positioned close to the high temperature region inlet, steam or steam—oxygen mixture is fed to a second inlet positioned close to the high temperature region outlet in an embodiment. As a result of this, the reaction system is separated into two or more regions.

In another embodiment; different reactants such as carbon dioxide, hydrogen, oxygen, nitrogen, ethane, methane, steam are fed in different ratios. Different percentage compositions are fed from the high temperature region inlet, the high temperature region and the high temperature region outlet for being added to the plasma medium of the reactor. The fuel and/or waste which stop by the plasma and transform and reactant gases to be fed form the product gas composition. These product gases secondarily carry out the reforming reactions with the gases fed to the high temperature region and right to its outlet. These secondary reactions take place simultaneously also in case of feeding the reactant gases from one point, however; the secondary feedings are effective for obtaining high energy gas. Significant transitions among carbon dioxide and carbon monoxide are seen at the secondary feedings and plasma experiments performed above 1400° C., these are seen in the graphs of the gases obtained by working of the reactor we have developed. Due to the high energy plasma and relatively high oxygen composition; while hydrocarbons and partially hydrogen are produced as well as the products having high oxygen and carbon concentration, the mixture comprising high hydrocarbon gases is obtained by processing these formed gases at approximately 1000° C. and above, preferably at the temperatures of 1400-1700° C. at the high temperature region outlet.

In the invention, the reactant inlets of the reactor are turned into flexible feedings with gas feeding nozzles whose feeding place and angle are changeable for directing the products obtained from reactions.

DETAILED DESCRIPTION OF THE INVENTION

In this invention; high temperature is defined as 1200° C. and above. This temperature can be increased up to the reactor material limits.

DESCRIPTION OF THE FIGURES

FIG. 2: The working method of the disclosed reactor of the invention

DESCRIPTION OF THE REFERENCES IN THE FIGURES

Figure 1:
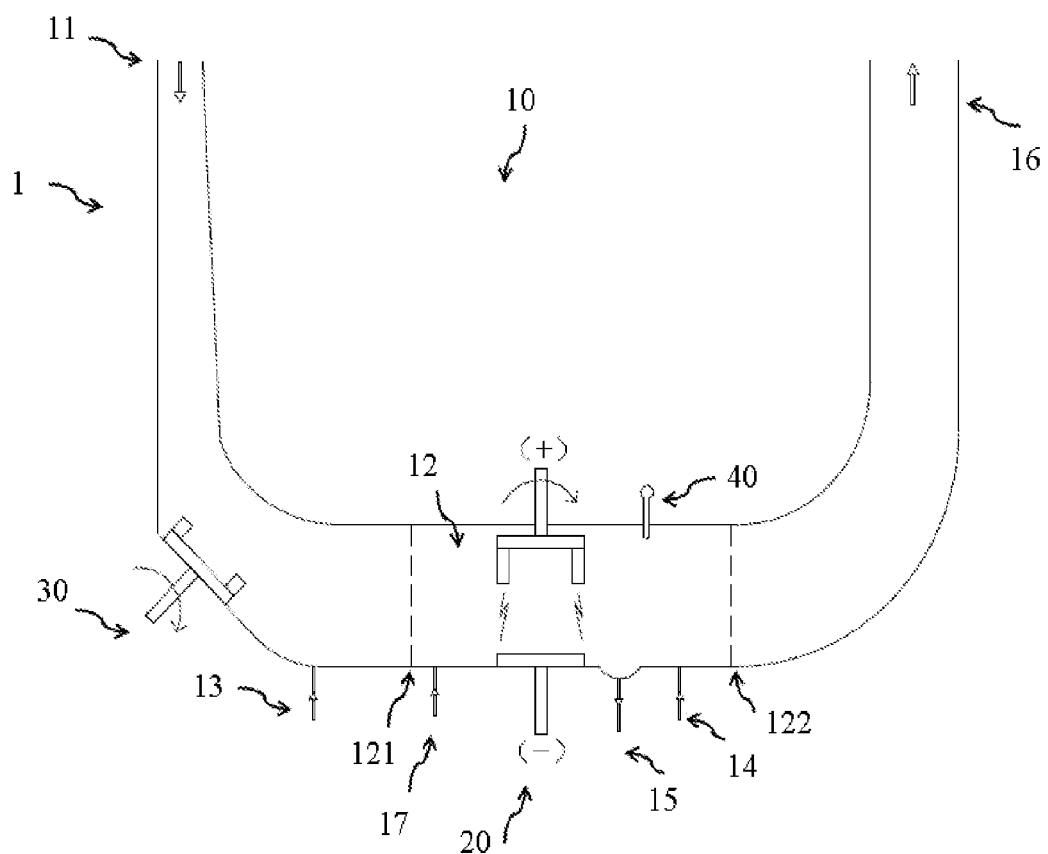
FIG. 1: It is the general schematic view of the disclosed reactor of the invention.

For the purpose of this invention, the parts in the figures are numbered respectively and the equivalents of these numbers are given below.

1 Reactor
    10- Body
        11- Waste inlet
        12- High temperature region
            121- High temperature region inlet
            122- High temperature region outlet
        13, 14, 17- Reactant inlet
        15- Melt outlet
        16- Gas outlet
    20- Temperature unit
    30- Waste pusher
    40- Temperature measuring unit The disclosed reactor (1) of the invention comprises at least one waste inlet (11) from which the fuel and/or wastes are fed to the reactor (1), at least one high temperature region (12) where endothermic reactions occur, at least one reactant inlet (13 and/or 14 and/or 17), at least one melt outlet (15) providing the exit of melts (i.e. slags) which inorganic substances coming from the fuel and/or wastes form via heat, a gas outlet (16) to which the fuel and/or wastes entering to the reactor (1) are directed to the high temperature region (12) such that gasification does not start before they enter to this region (12) and therefore where the gases leaving the reactor (1) as a result of the reaction pass through the high temperature region (12) and exit from the reactor (1), which has a different openness from the waste inlet (11) and at least one temperature unit (20) providing high temperature in the reactor (1).

In addition; the disclosed reactor (1) of the invention comprises at least one waste pusher (30) which helps for pushing the fuel and/or wastes to the high temperature region (12) therefore for preventing blockage in the reactor (1) and gasification before the high temperature region (12) and which is positioned between the waste inlet (11) and the high temperature region (12) and at least one temperature measuring unit (40) for measuring the temperature of gases.

In an embodiment of the invention, the reactor (1) comprises a high temperature region (12) positioned between the waste inlet (11) and the gas outlet (16).

The disclosed reactor (1) of the invention comprises a body (10) such that the gasification does not start before the fuel and/or wastes enter to the high temperature region (12), such that it provides that the fuel and/or wastes pass through the high temperature region (12) and thus the gases having at least 1200° C. temperature exit from the reactor (1).

In an embodiment of the invention, the reactor (1) comprises two arms having the waste inlet (11) at the end of one of them and the gas outlet (16) at the end of the other. This reactor (1) comprises the body (10) formed by positioning these arms in different forms from 180 degrees horizontal to 0 degree vertical position according to each other, including 180 and 0 degrees. In the embodiment in which the arms are positioned with the angle of 180 degrees according to each other, two arms reach the pipe type linear form. In this case, this arm has the waste inlet (11) at its one end, the gas outlet (16) openness at the other end. An alternative of this embodiment is U formed reactors (1).

In an embodiment of the disclosed reactor (1) of the invention, the reactor (1) comprises a waste inlet (11) at an end part of an arm of the reactor (1), a gas outlet (16) at an end part of the other arm of it. This reactor (1) comprises high temperature region (12) and at least one reactant inlet (13 and/or 14 and/or 17) at another arm connecting these arms.

In the embodiment wherein the body (10) of the reactor (1) is U formed; the waste inlet (11) is created at an arm of the body (10), the gas outlet (16) is created at the end of another arm. In the invention, at least one reactant gas inlet (13 and/or 14 and/or 17) and high temperature region (12) are created at a horizontal arm of the body (10) connecting these arms for providing direction of reforming, namely; of elemental level and ionic level reactions to the high efficient gas product direction. In the preferred embodiment, the high temperature region (12) is created by positioning the temperature unit (20) at the middle of the horizontal arm of U body (10). Gasification of the fuel and/or wastes entering to the reactor (1) before they enter to the high temperature region (12) is prevented by U formed body (10). Because entering of the fuel and/or wastes which enter to the reactor (1) to the high temperature region (12) is made necessary due to this form of the body (10).

Solid waste (domestic waste, industrial waste, coal, biomass . . . etc.) and/or liquid waste (petroleum wastes, treatment sludge . . . etc.) and/or gas waste and/or fuel that may be in any phase are fed to the waste inlet (11) in the body (10) of the disclosed reactor (1) of the invention.

The disclosed reactor (1) of the invention has the high temperature region (12) comprising at least one temperature unit (20) which provides the temperature of the gas mixture exiting from the reactor (1) to reach 1200° C. High temperature environment is obtained with the help of plasma arcs realized by the temperature unit (20) in this region (12). Therefore, it provides that full efficient gasification is carried out by dissolving ash and tar and by reacting of all solid carbon. The reactions are developed in the endothermic direction by being controlled and directed via primary and/or secondary reactant inlets (13 and/or 14 and/or 17), therefore; high energy gas mixture may be formed in the high temperature region (12) due to the high temperature. Dissolving of tar and ash is provided due to the fact that the temperature of the gas mixture reach at least 1200° C. via the disclosed reactor (1) of the invention. Also for this reason, the exit gases do not need to be subjected to reforming additionally in this invention where the reactions can be directed widely with different inlet gases according to the exit gas composition. In addition, there is not any need of gas recovery. That's why; additional units are not necessary such as ash melting unit, gas recovery unit etc. in the invention. The high temperature region (12) comprises a high temperature region inlet (121) where the fuel and/or wastes fed from the waste inlet (11) enter to the high temperature region (12) and a high temperature outlet (122) where said fuel and/or wastes exit from the region (12) by gasifying. Due to the U form of the body (10); all fuel and/or wastes fed to the reactor (1) have to leave the reactor (1) from the high temperature region outlet (122) by passing through the high temperature region inlet (121) and by gasifying. Therefore; gasification of all fuel and/or wastes occurs with high conversion and so all fuel and/or wastes gasify except of inorganic substances.

The reactants fed from the reactant inlets (13 and/or 14 and/or 17) are gases such as carbon dioxide, hydrogen, nitrogen, ethane, methane, oxygen, steam . . . etc. or mixtures of their different combinations.

In an embodiment, the reactor (1) comprises at least one primary reactant inlet (13 and/or 14) from which the gasification reactants are fed for production of the high energy gas mixture and which is positioned close to the high temperature region inlet (121); and at least one secondary reactant inlet (14 and/or 17) positioned close to the high temperature region outlet (122).

In an embodiment of the invention, the reactor (1) comprises at least one reactant inlet (13 and/or 14 and/or 17) having the feeding point whose direction and/or angle can be arranged. This reactant inlet (13 and/or 14 and/or 17) can move forwards and backwards in the feeding pipes and rotate 360 degrees in the reactor (1).

In an embodiment of the invention; the reactor (1) comprises reactant inlets (13, 14, 17) positioned at the high temperature region inlet (121), at the high temperature region (12) and right at the high temperature region outlet (122).

A large amount of carbon monoxide is formed at the close region to the high temperature region inlet (121) by the reaction of the fuel and/or wastes fed to the reactor (1) with the reactants entering from the primary reactant inlet (13). The carbon monoxide in the carbon monoxide-gas mixture formed in large amounts is consumed by reacting of the reactants fed from the secondary reactant inlet (14) (Graph 4) and hydrocarbons (methane, ethane . . . etc.) are formed (Graph 1 and 2). In this embodiment, the reactant inlets (13 and 14) are fed simultaneously and continuously when the gasification process is carried out. Thus; the amount of carbon monoxide exiting from the reactor (1) is decreased and less harmful gas emission to the environment is made. At the same time; directing of the reaction of the gases formed from high kinetic transformation in the high temperature region (12) which is desired in the high temperature region (12) and such that it tends to the gas composition with high heating efficiency is provided by third adjustable reactant inlet (17) feeding with different gas compositions. In an embodiment, the angles and geometric locations of these reactant inlets (13, 14, 17) in the reactor (1) are adjusted by measuring the mixture and percentages of the exit gas. In addition; the compositions of the gases fed from the reactant inlets (13 and/or 14 and/or 17) can be changed according to the exit gas in an embodiment. Therefore, the exit gas can be controlled. In the disclosed reactor (1) of the invention, all necessary electrical electronical and mechanical equipment are developed to control the feeding for adjusting the composition of the exit gas.

In the body (10) of the disclosed reactor (1) of the invention, special gas compositions are possible to be obtained according to the reactants fed from the inlet (13, 14 and/or 17) positioned close to the high temperature region inlet and outlet (121 and 122). For example; different gas compositions when steam is fed from the inlet (13, 14 or 17), different gas compositions when methane is fed are possible to be obtained. Therefore; a high reaction directing capacity is obtained in the gasification at the high temperature region outlet (122) with this body (10) developed.

In an embodiment of the disclosed reactor (1) of the invention, it comprises a primary reactant inlet (13 and/or 14) positioned close to the high temperature region inlet (121) but out of the high temperature region (12), a secondary reactant inlet (14 and/or 17) positioned close to the high temperature region outlet (122) but inside the high temperature region (12) for production of high energy gas mixture.

The reactant inlet (13, 14, 17) comprises a feeding point where the direction of the fed gas is determined. In an embodiment of the invention, the direction and angle of the feeding point of the reactant inlet or inlets (13 and/or 14 and/or 17) can be adjusted.

In the disclosed reactor (1) of the invention, inorganic substances become melt via heat and leave the reactor (1) from the melt outlet (15) before it reacts.

In the invention; the gas outlet (16) where the gases leaving the reactor (1) after reaction exit from the reactor (1) by exiting from the high temperature region (12) is a different outlet from the waste outlet (11). In other words; the gas outlet (16) has a different openness from the openness waste inlet (11) forms and the gases are directed to another way which this openness forms such that they do not meet with the fuel and/or wastes entering from the waste inlet (11) and they exit from the gas outlet (16) at the end of this way.

In the preferred embodiment of the disclosed reactor (1) of the invention, the temperature unit (20) comprises at least one electrode which forms the high energy gas mixture by creating plasma arcs and makes the temperature of this exiting gas mixture reach at least 1200° C. In an embodiment of the invention, the electrodes are preferably graphite, however not limited with this.

In another embodiment of the invention, the electrodes providing high temperature act as gas mixer by rotating around its own axis. Therefore, the electrodes increase the reaction rate by increasing the collisions between the gas molecules.

In an embodiment of the invention, the temperature unit (20) is in the form such that it provides the temperature of the exiting gas mixture to exceed 1600° C.

In an embodiment of the invention; the waste pusher (30) is positioned between the vertical arm and the horizontal arm of the reactor (1) and directs the fuel and/or wastes from the vertical arm to the horizontal arm. That's why; it contributes to prevent the gasification before entering of the fuel and/or wastes to the high temperature region (12) in the reactor (1) by preventing the blockage in the vertical arm of the reactor (1).

In an embodiment of the invention, the waste pusher (30) comprises a rotary drive mechanism. The fuel and/or wastes are transferred to the high temperature region (12) via the waste pusher (30) by being rotated. Also; the waste pusher (30) may have a drive mechanism with finger in an embodiment. The fingers of the waste pusher (30) provide the waste not to stick and settle and contact of all wastes to the high temperature region (12).

In the disclosed reactor (1) of the invention, the temperature measuring unit (40) which measures the temperature of the exiting gases comprises preferably at least one thermocouple in an embodiment of the invention. These thermocouples comprises preferably radium-platinum. In another embodiment, the temperature measuring unit (40) comprises at least one pyrometer. The temperature measuring unit (40) is not limited with them. In a preferred embodiment of the invention, the temperature measuring unit (40) is positioned close to the high temperature region outlet (122). Therefore, it is provided that the temperature of formed gases is measured most correctly. Also, at least three temperature measuring units (40) are positioned at the high temperature region inlet (121), the high temperature region (12), high temperature region outlet (122) in another embodiment.

To summarize; the reactor (1) works as follows: The fuel and/or wastes and reactants are fed to the reactor (1) continuously in the invention. The reactor (1) is heated up to at least 1200° C. via the temperature unit (20) before the gasification starts. After enough temperature is monitored from the display of the temperature measuring unit (40), the fuel and/or wastes are fed from the waste inlet (11) and the fuel and/or wastes are pushed to the high temperature region (12) by rotating the waste pusher (30). Then gasification occurs in the high temperature region (12). Meantime; the reactants are fed from the inlets (13, 14 and/or 17) positioned close to the high temperature region inlet and outlet (121 and 122). After the reactions occurring in the high temperature region (12) by feeding the reactants, hydrocarbons are formed by reacting of all carbon and hydrogen atoms. And these hydrocarbons transform into gases such as hydrogen, methane, carbon monoxide, carbon dioxide, ethane, oxygen etc. So the gasification is carried out with high efficiency. The gas mixture obtained as a result of the gasification integrated with this controlled system has high energy.

The formed gases become ions with high temperature and meantime a lot of reversible reactions occur very fast, all hydrocarbons are dissolved including tar. Steam and carbon monoxide which are last products of combustion are formed in less amounts and hydrocarbon compounds are formed in greater amounts than the normal plasma gasification. This gas mixture having high heating energy is taken from the gas outlet (16) and converted to electrical or mechanical energy by burning in various motors.

The disclosed reactor (1) of the invention works according to the steps of gasification method (100) below.

Heating the reactor (1) via the temperature unit (20) (101),
Feeding the fuel and/or wastes from the waste inlet (11) in the reactor (1) (102),
Transferring the fuel and/or wastes to the high temperature region (12) (103),
Feeding the reactants to the reactor (1) continuously (104),
Occurring of reactions in the high temperature region (12) (105),
Forming gases after the reactants are fed and reactions occur in the high temperature region (12) (106),
Leaving the reactor (1) from the gas outlet (16) by the formed high energy gas having at least 1200° C. temperature (107),
Leaving the reactor (1) from the melt outlet (15) by all inorganic substances melting (108).

In an embodiment of the method (100); the reactor (1) is heated with the temperature unit (20) comprising at least one electrode in the 101. step. In an embodiment of the method (100); the fuel and/or wastes are fed in solid and/or liquid and/or gas phase in the 102. step.

In an embodiment of the method (100); the reactants are fed from the inlets (13 and/or 14 and/or 17) simultaneously and continuously in the 104. step.

In the 104. step of the disclosed reactor working method (100) of the invention; preferably oxygen or the mixture of oxygen with steam which is in less amount than oxygen is fed from the primary reactant inlet (13) and steam or the mixture of steam with oxygen which is in less amount than steam is fed from the secondary reactant inlet (14). In an embodiment of the method (100); at least one of carbon dioxide, hydrogen, nitrogen, ethane, methane gases is used with the oxygen and steam as reactant in the 104. step.

In an embodiment of the method (100); the gases formed in the (106 or 107). step are hydrocarbons and hydrogen, methane, carbon monoxide, ethane, oxygen gases converted from hydrocarbons.

In an embodiment of the method (100); at least one of carbon dioxide, hydrogen, nitrogen, ethane, methane, oxygen, steam is used as reactant in the 104. step.

In this method (100); special gas compositions are obtained according to the reactants fed from the reactant inlet (13, 14 and/or 17) and therefore, gases with high energy production capacity are formed in the gasification at the high temperature region outlet (122) in the 106. and 107. steps.

In an embodiment of the method (100), the compositions of the gases fed from the reactant inlet/inlets (13 and/or 14 and/or 17) are changed according to the exiting gas.

In an embodiment of the method (100), angles and geometric locations of the reactant inlet/inlets (13 and/or 14 and/or 17) in the reactor (1) are adjusted by measuring the mixture and percentages of the exiting gas.

In an embodiment of the method (100), the high temperature gases which are formed may be pressurized in the 107. step for being used in a turbine and/or cycles after they exit from the reactor (1).

In an embodiment of the method (100), the high temperature gases are aspirated towards the openness of the gas outlet (16) for being directed to the opposite direction of the direction from which the fuel and/or waste comes.

In another embodiment of the method (100); when carbon dioxide is fed to the secondary gas feeding section, carbon dioxide reforming occurs due to the other type gases fed with secondary and primary feeding and the gases produced via plasma and the amount of the hydrocarbon gases in the product mixture is increased by combining of the carbon in the carbon dioxide with hydrogen and the other components via carbon and this reforming and therefore, high efficient gas is obtained. This process provides a very important saving opportunity for the world in terms of reforming of carbon dioxide. This quality of the invention is the most prominent quality of it. This change is provided with the controlled reactant inlets (13, 14 and/or 17).

In another embodiment of the invention; because the high temperature gas is needed not to be removed for increasing the efficiency, this gas is passed through a heat exchanger, therefore; pre-heating of the fuel and/or wastes and reactant gases entering to the reactor (1) may be provided.

In another embodiment; energy production is provided by entering of the high temperature gases into a turbine. After exiting from this turbine, energy production is provided by subjecting of the gases to a steam heating and steam cycle.

With said invention; any types of waste and fuel are gasified with high efficiency, it is prevented ash and tar to be problem. Reactors (1) can be produced in any size due to the invention. That's why; it is provided that the wastes are evaluated and transformed into energy in their own location without need for transporting them to another region for recycling and pollution and economical problems caused by transporting wastes are overcome.

Additionally; forming of highly flammable gases by dissolving tar for high energy efficiency at high temperatures and overcoming the ash problem by melting inorganic substances are provided with the plasma gasification method. The plasma reactor (1) can be operated only as a reforming reactor via controlled reforming.

Also; releasing of heavy metals, which are harmful to health, to atmosphere is prevented by evacuating solids like zinc, lead, aluminum which can melt and vaporize at low temperatures out of the reactor (1) as melt with the gravitation effect.

The invention is not limited with the disclosed embodiments above, a skilled person in the art can produce different embodiments of the invention easily. They should be evaluated within the scope of invention protection demanded with claims.

The invention claimed is:

1. A reactor (1) comprising at least one temperature unit (20) which provides high temperature, at least one waste inlet (11) where fuels and/or wastes are fed to the reactor (1), at least one reactant inlet (13 and/or 14 and/or 17), at least one melt outlet (15) which provides an output for a melt formed by inorganic substances coming from heating fuels and/or wastes; the reactor further comprising:
    a high temperature region (12) configured to be heated to at least 1200° C. by the temperature unit (20) and where endothermic reactions are realized;
    a primary and secondary reactant inlet equipment (13 and/or 14 and/or 17) where gassing reactants are fed for production of high energy gas mixture and moreover which can be guided to the high temperature region inlet, the high temperature region, and a high temperature region outlet from changeable different points comprising gas feeding nozzles with variable feeding location and variable angle for controlling reactions;
    a U-shaped body which provides prevention of gassing before the fuels and/or wastes enter into the high temperature region (12) which enters into the reactor (1) where the reactant inlets (13 and/or 14 and/or 17) are turned into flexible feeding;
    wherein:
    the first end of said U-shaped body is fuel and/or waste inlet (11) and the second end thereof is gas outlet (16) and said high temperature region (12) is provided at the horizontal part between the two ends and thus, the entry of the fuels and/or wastes, which enter into the reactor (1), into the high temperature region (12) is made obligatory because of this form of the body (10),
    said gas outlet (16) is positioned at a level which is higher than the level of said waste inlet (11), such that a pressure difference is formed as a result of the reaction from the waste inlet (11) towards the direction which is reverse to the direction where fuels and/or waste enter, the high temperature gases which are to leave the reactor (1) pass through the high temperature region (12) and are guided to the gas outlet (16) and exit the reactor (1).

2. A reactor (1) according to claim 1, wherein at least one temperature unit (20) is provided which provides the gas mixture temperature to reach at least 1200° C. and thus which provides completely efficient gassing as ash and tar are dissolved and all solid carbon enters into reaction and which provides the gas mixture, which is to exit the reactor (1), to reach at least 1200° C.

3. A reactor (1) according to claim 1 or 2, further comprising:
    a high temperature region inlet (121) where the fuels and/or wastes are fed through the waste inlet (11) and enter into the high temperature region (12);
    a high temperature region outlet (122) where said fuels and/or wastes are gassed and exit the region (12);
    at least one primary reactant inlet (13 and/or 14) where the gassing reactants are fed for production of high energy gas mixture and positioned at a location which is close to the high temperature region inlet (121); and
    at least one secondary reactant inlet (14 and/or 17) positioned at a location which is close to the high temperature region outlet (122).

4. A reactor (1) according to claim 3, further comprising reactant inlets (13, 14, 17) positioned at the high temperature region inlet (121), high temperature region (12) and high temperature region outlet (122).

5. A gasification method conducted in a reactor according to claim 1, the method comprising:
    heating the high temperature region (12) via the temperature unit (20) to a temperature of at least 1200° C.;
    inputting the fuel and/or wastes continuously through the waste inlet (11),
    feeding the fuel and/or wastes from the waste inlet to the reactor (1),
    transferring the fuel and/or wastes to the high temperature region (12),
    conducting reactions and gasification processes in the high temperature region (12),
    releasing the high energy gas mixture obtained by the gasification processes from the reactor (1) through the gas outlet (16), wherein the high energy gas mixture has a temperature of at least 1200° C.,
    releasing the melt formed by inorganic substances from the melt outlet (15).

6. A method according to claim 5, further comprising continuously feeding the gassing reactants from the at least one reactant inlet (13 and/or 14 and/or 17).

7. A method according to claim 5, wherein heating the high temperature region (12) via the temperature unit (20) comprises at least one electrode.

8. A method according to claim 5, comprising feeding the fuel and/or wastes to the reactor (1) in solid and/or liquid and/or gas phase.

9. A method according to claim 6, wherein feeding the gassing reactants comprises:
    feeding oxygen or a first mixture comprising oxygen and steam, the first mixture comprising more oxygen than steam, from the primary reactant inlet (13 and/or 14 and/or 17); and
    feeding steam or a second mixture comprising steam and oxygen, the second mixture comprising more steam than oxygen, from the secondary reactant inlet (13 and/or 14 and/or 17).

10. A method according to claim 5, further comprising passing the high energy gas mixture through a heat exchanger configured to pre-heat the fuel and/or wastes and the gassing reactants entering to the reactor (1).

11. A method according to claim 5, further comprising aspirating the high temperature gases towards an opening in the gas outlet (16) in a direction opposite to the direction of the fuel and/or waste entering the waste inlet (11).

12. A method according to claim 5, further comprising changing the compositions of the gassing reactants according to the high temperature gases exiting the reactor (1).

* * * * *